(12) United States Patent
Pedlar et al.

(10) Patent No.: US 8,868,312 B2
(45) Date of Patent: Oct. 21, 2014

(54) VEHICLE SPEED CONTROL APPARATUS AND METHOD

(71) Applicant: Ford Global Technologies, LLC, Dearborn, MI (US)

(72) Inventors: Chris Edward Pedlar, Chelmsford (GB); Chris Connelly, Great Dunmow (GB); David Hesketh, Ingatestone (GB); Themi Philemon Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/779,534

(22) Filed: Feb. 27, 2013

(65) Prior Publication Data

US 2013/0226420 A1 Aug. 29, 2013

(30) Foreign Application Priority Data

Feb. 27, 2012 (GB) .................................. 1203312.2

(51) Int. Cl.
*B60W 10/02* (2006.01)
*B60W 10/06* (2006.01)
*B60W 30/00* (2006.01)
*B60W 30/14* (2006.01)
*B60K 31/04* (2006.01)
*B60W 30/16* (2012.01)
*B60W 30/18* (2012.01)

(52) U.S. Cl.
CPC ................ *B60W 30/00* (2013.01); *Y02T 10/52* (2013.01); *B60W 30/143* (2013.01); *B60K 31/047* (2013.01); *B60W 10/06* (2013.01); *B60W 30/16* (2013.01); *B60K 2310/242* (2013.01); *B60W 10/02* (2013.01); *B60W 2030/1809* (2013.01)
USPC ................ 701/96; 701/93; 701/67; 701/110; 123/350

(58) Field of Classification Search
CPC ................... B60W 30/143; B60W 30/18072; B60W 30/16; B60W 2030/18072; B60W 2030/1809; B60W 2710/10; B60W 2710/0627; B60W 10/02; B60W 10/06; F02D 41/0002; B60K 31/047
See application file for complete search history.

(56) References Cited

U.S. PATENT DOCUMENTS

| | | | |
|---|---|---|---|
| 4,078,631 A * | 3/1978 | Kadota et al. | 180/179 |
| 6,470,256 B1 | 10/2002 | Cikalo et al. | |
| 6,902,021 B2 * | 6/2005 | Kikuchi et al. | 180/170 |

(Continued)

FOREIGN PATENT DOCUMENTS

| | | |
|---|---|---|
| CN | 101994583 A | 3/2011 |
| EP | 2476572 A2 * | 7/2012 |

(Continued)

*Primary Examiner* — Michael J Zanelli
(74) *Attorney, Agent, or Firm* — Julia Voutyras; Alleman Hall McCoy Russell & Tuttle LLP

(57) ABSTRACT

The present disclosure describes systems and methods for controlling the speed of a vehicle comprising: during a pulse phase of cruise control, applying engine torque to raise speed, the amount and duration of which being responsive to engine speed; and during a glide phase of cruise control, discontinuing engine combustion. In this way cruise control may maintain a mean speed equivalent to a desired, threshold speed while reducing fuel consumption, and NVH effects felt by the end user compared to traditional cruise control methods.

16 Claims, 5 Drawing Sheets

(56) References Cited

U.S. PATENT DOCUMENTS

| | | | |
|---|---|---|---|
| 8,340,884 B1* | 12/2012 | He et al. | 701/103 |
| 8,542,844 B2* | 9/2013 | Bowden et al. | 381/71.4 |
| 2004/0084237 A1* | 5/2004 | Petrie, Jr. | 180/170 |
| 2011/0035135 A1 | 2/2011 | Schwalm et al. | |
| 2011/0130939 A1 | 6/2011 | Hartmann et al. | |
| 2012/0100960 A1 | 4/2012 | Pedlar et al. | |
| 2013/0211686 A1* | 8/2013 | Shono et al. | 701/70 |

FOREIGN PATENT DOCUMENTS

| | | | |
|---|---|---|---|
| JP | 2007-187090 | * | 7/2007 |
| JP | 2007276542 A | | 10/2007 |
| JP | 2012-47148 | * | 3/2012 |
| WO | 2012029178 A1 | | 3/2012 |

* cited by examiner

VEHICLE SPEED CONTROL APPARATUS AND METHOD

CROSS REFERENCE TO RELATED APPLICATIONS

The present application claims priority to United Kingdom Patent Application Number 1203312.2, filed on Feb. 27, 2012, the entire contents of which are hereby incorporated by reference for all purposes.

TECHNICAL FIELD

The present application relates to a vehicle speed control apparatus and method.

BACKGROUND AND SUMMARY

The present disclosure relates to controlling the speed of a vehicle during a cruise control mode to increase fuel economy and/or emissions.

Cruise control systems are provided within vehicles to automatically control the vehicle's speed without any input, such as operation of the accelerator pedal, by the driver. Typically, a set point value related to the desired speed is defined by the driver. The vehicle speed is automatically controlled until the driver intervenes, such as by operating one or more of the brake, clutch, accelerator or mode switch.

Known adaptive cruise control systems can also provide automatic braking or dynamic set speed type controls. Automatic braking systems allow a vehicle to keep pace with the car it is following, slow when closing in on the vehicle in front and accelerate again to the threshold speed when traffic allows. Dynamic set speed uses the GPS position of speed limit signs to set the threshold speed.

Existing speed control algorithms can accurately maintain vehicle speed at the threshold speed, even under varying road gradients. However, these algorithms are not optimized for fuel economy or emissions. It is known that, even when traversing varying road gradients with gentle slopes, this can be done more economically by a skilled driver. The driver can maintain a relatively constant throttle position and allow the vehicle to accelerate on the downgrades and decelerate on upgrades, the driver reducing power when cresting a rise and increasing power before an upgrade is reached. Known cruise control systems tend to over-throttle on the upgrades and retard on the downgrades, thus wasting the energy available from the inertia of the vehicle.

Internal combustion engines operate most efficiently in terms of brake specific fuel consumption (BSFC) at a particular combination of engine speed, and torque. However, when cruising at constant speed the engine may be far from the optimal BSFC operating point.

Most speedometers have a tolerance of around±10%. Vehicle manufacturers typically calibrate speedometers to read high by an amount equal to the average error to ensure that the speedometer does not indicate a lower speed than the actual speed of the vehicle.

Systems and methods for controlling the speed of a vehicle are provided comprising: during a pulse phase of cruise control, applying engine torque to raise speed, the amount and duration of which being responsive to engine speed; and during a glide phase of cruise control, discontinuing engine combustion. In this way cruise control may maintain a mean speed equivalent to a desired, threshold speed while reducing fuel consumption, and NVH effects compared to traditional cruise control methods.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

Figure 1:
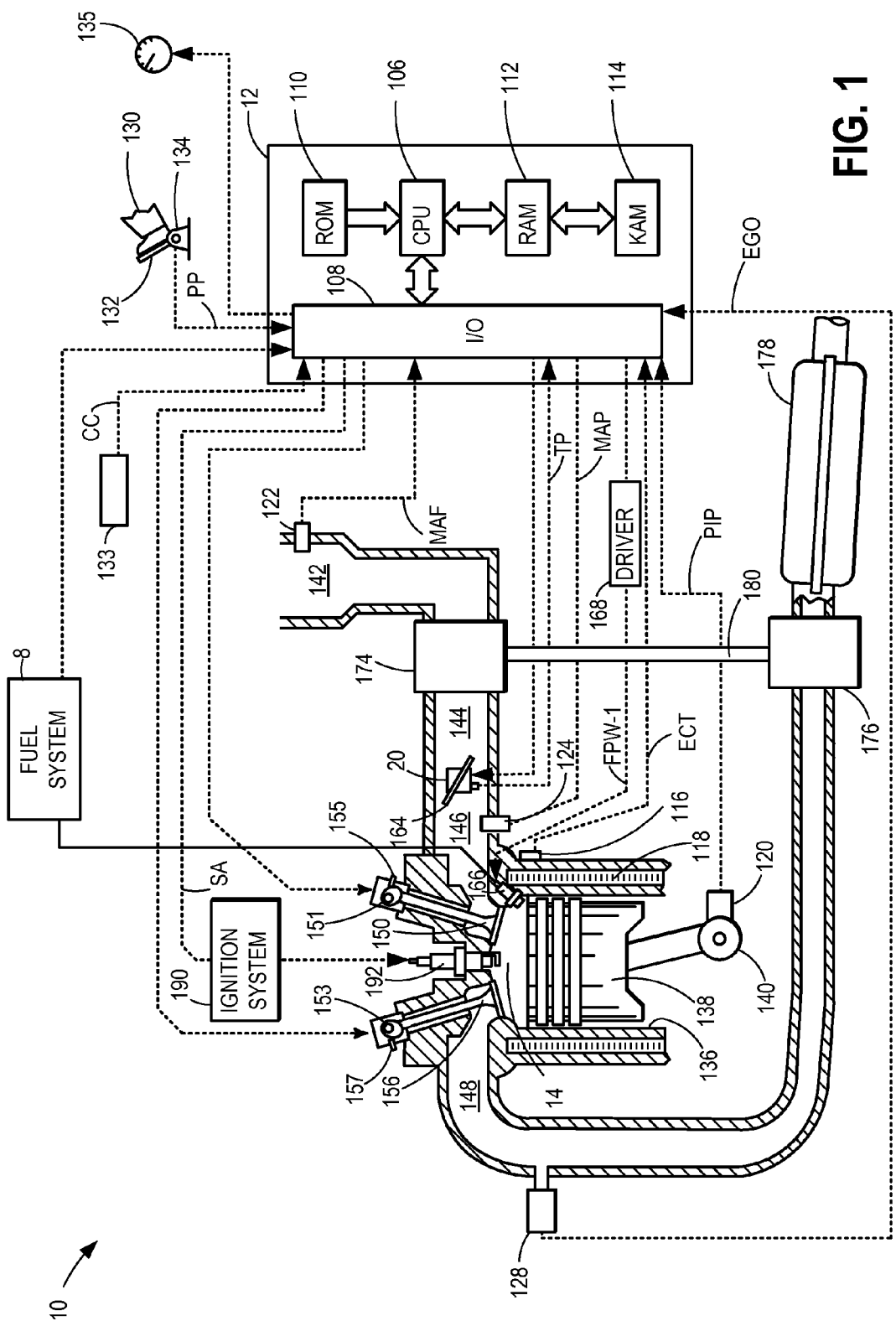
FIG. 1 shows an example cylinder of an internal combustion engine.

Referring now to the figures, FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Also included is an input switch 133 for generating a cruise control signal CC. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 1 shows one cylinder of a multi-cylinder engine. As such each cylinder may similarly include its own set of intake/exhaust valves, fuel injector(s), spark plug, etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may reduce engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type)

coupled to crankshaft 140; throttle position (TP) from a throttle position sensor; and manifold absolute pressure signal (MAP) from sensor 124. Engine speed signal, RPM, may be generated by controller 12 from signal PIP. Engine speed may be displayed on tachometer 135. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed. Furthermore an engine controller may be adapted to determine a brake specific fuel consumption value for a given engine speed and torque and maximize fuel efficiency based on these values. At least one of the first and the second predetermined values may be dependent on the brake specific fuel consumption value for the respective vehicle speed. This information may be predetermined and stored in in an engine control unit, for example.

Figure 2:
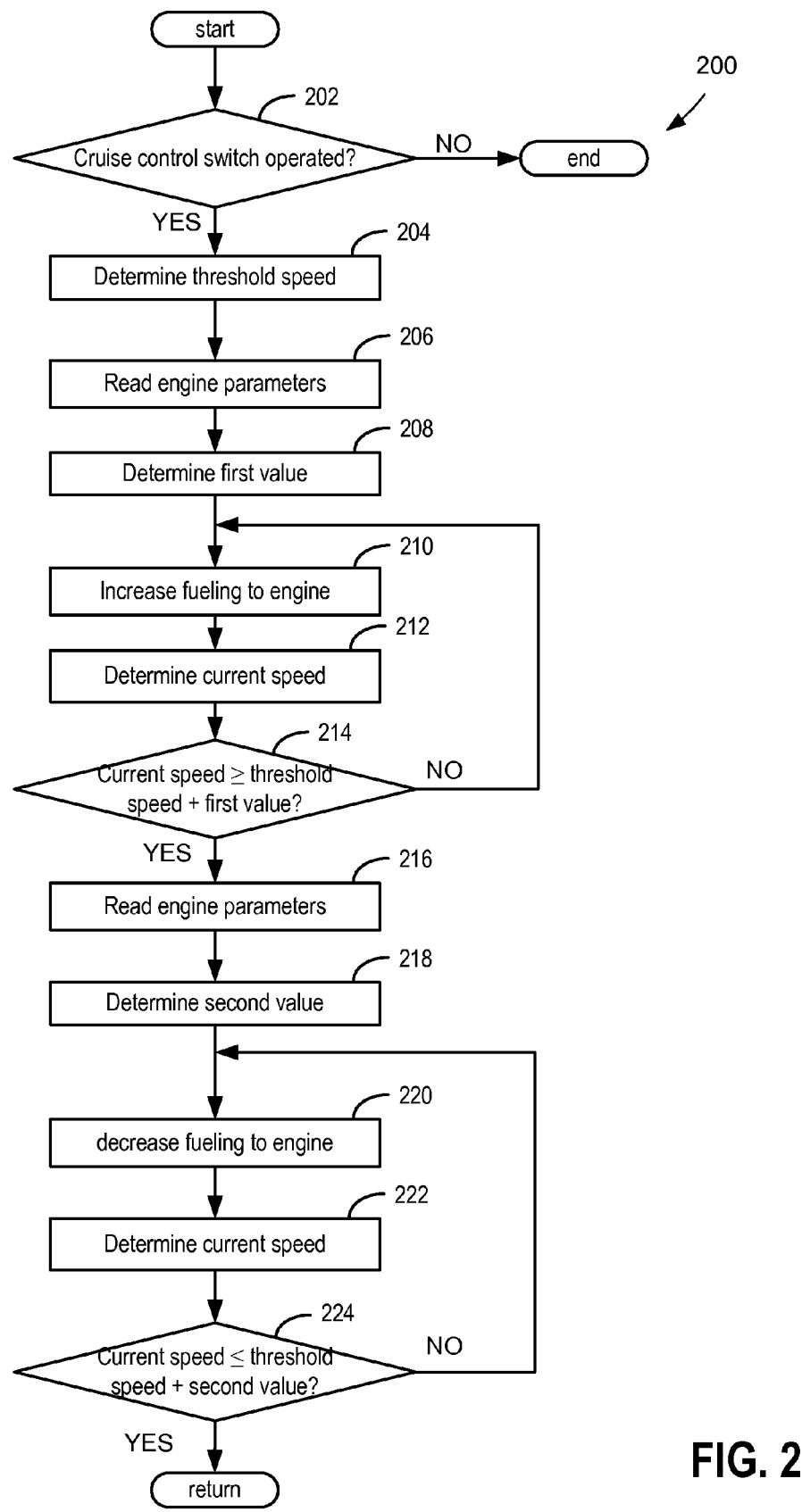
FIG. 2 is a flow chart of a cruise control method according to the disclosure.

FIG. 2 shows a method of automatically controlling the speed of a vehicle. The method is carried out by an automatic speed control apparatus. This apparatus may be part of the engine controller of the vehicle or a separate component communicatively connected to the controller. The apparatus may comprise a controller 12 comprising a processor 106 and memory, such as read only memory 110, and various sensors for measuring engine parameters and vehicle speed.

The apparatus may be operatively coupled to the fuel supply system of the vehicle. The apparatus may be adapted to at least one of increase or decrease the amount of fuel supplied to the engine to cause vehicle acceleration.

The apparatus may be operatively coupled to the vehicle transmission. The apparatus may be adapted to decouple the vehicle wheels from the engine. The apparatus may be adapted to disengage a transmission clutch of the vehicle.

The apparatus also includes an input switch, which is operable by the driver and causes the apparatus to enter a cruise control mode. At step 202, the processor continuously monitors the state of the switch. If not operated (NO) the processor returns to monitoring the switch. If input is received indicated the cruise control switch has been operated (YES), the apparatus enters the cruise control mode and moves to step 204.

At 204, the processor determines a threshold speed. This initially corresponds to the current speed of the vehicle and so the processor sets the threshold speed to the sensed current speed. However, the processor may be adapted such that the threshold speed is adjustable by the driver during cruise control.

Next, at step 206, various engine parameters are sensed. These parameters may be engine speed, load, AFR and others. At step 208, a first predetermined value is determined. This value is dependent on the engine parameters and is selected to provide an optimal brake specific fuel consumption (BSFC) performance from the engine. However, an upper threshold may also be applied, such as that the first predetermined value is not greater than 10% of the threshold speed. A first value may be determined based on engine speed and torque output and may vary with brake specific fuel consumption for a given output. This will be described in greater detail below with reference to FIG. 4.

At step 210, the processor sends a signal to increase the amount of fuel delivered to the engine. This causes an increase in the vehicle speed.

At step 212, the current vehicle speed is sensed. The processor includes a comparator unit and, at step 214, the current vehicle speed is compared to a sum of the threshold speed and the first predetermined value. If the current vehicle speed is less than this sum (NO at 214) then the method returns to step 210 to further increase the supply of fuel. If the current vehicle speed has reached or exceeded the sum (YES at 214) then the method continues to step 216.

At step 216, the various engine parameters are again sensed. At step 218, a second predetermined value is determined. This value is also selected to provide an optimal BSFC performance from the engine. The optimal BSFC value will have changed as it is dependent on engine speed which will have changed as vehicle speed has been increased. A lower threshold may not be applied to avoid speed violations but may be applied to minimize the magnitude of the fluctuating around the threshold speed.

The first predetermined value or proportion may be substantially equal to the second predetermined value or proportion.

At least one of the first and the second predetermined values may be dependent on at least one engine parameter. At least one of the first and the second predetermined values may be dependent on the brake specific fuel consumption value for the respective vehicle speed. At least one of the first and the second predetermined values may be selected to produce an optimal brake specific fuel consumption value from the engine.

At least one of the first and second predetermined proportions may be a predetermined proportion or percentage above the threshold speed. The predetermined percentage may be 10% or less.

The method may include providing a controller comprising a processor and memory for carrying out the method. The predetermined values or proportions may comprise values or proportions stored in memory.

Alternatively, the predetermined values or proportions may be determined from a stored algorithm. The predetermined values or proportions may be determined in real time. The predetermined values or proportions may be determined just prior to changing the vehicle speed.

The predetermined values or proportions may comprise values or proportions stored in the memory.

At step 220, the processor sends a signal to decrease the amount of fuel delivered to the engine. This causes a decrease in the vehicle speed. In another embodiment, engine combustion may be discontinued during this "glide" phase of cruise control.

At step 222, the current vehicle speed is again sensed. At 224, the processor then compares the current vehicle speed with a difference of the threshold speed and the second predetermined value. If the current vehicle speed is greater than this difference (NO at 224), then the method returns to step 220 to further decrease the supply of fuel.

If the current vehicle speed has decreased such that it is equal or less than the calculated difference (YES at 224) then the method returns. Therefore, the method repeats the steps of increasing and decreasing the vehicle speed as long as the cruise control switch is operated. The cruise control switch may be turned off by a user input thus exiting the cruise control mode. However, in another, non-limiting example the cruise control switch may be turned off by another input, such as from a collision avoidance system.

Utilizing the method of the present disclosure small variations in vehicle speed around the threshold speed are allowed to occur in order to alternately operate close to the BSFC for short durations where the fueling is increased. These pulse periods are followed by periods of glide, under no load the vehicle is allowed to coast. During these coasting periods, fueling will either be removed altogether, with the vehicle driving the engine, or maintained at a level sufficient to balance engine drag torque, but providing no torque to the wheels. In this way the vehicle speed will maintain a mean value around the threshold speed, but the fuel consumption will be reduced versus a constant fueling regime.

In an alternative embodiment, the step of decreasing the vehicle speed may involve decoupling the vehicle wheels from the engine, such as by disengaging a transmission clutch of the vehicle.

The present disclosure allows small variations in vehicle speed around the threshold speed in order to operate at or close to the optimal BSFC. Using the pulse and glide approach, the vehicle speed will have a mean value around the threshold speed, but the fuel consumption will be reduced in comparison to a constant fueling regime.

A cruise control apparatus of the present disclosure may further be an adaptive automatic speed control apparatus. The apparatus may include a detecting system, such as radar, to detect a vehicle in front and determining a distance to the vehicle in front. The apparatus may be adapted to maintain the vehicle within a distance range to the vehicle in front.

The disclosure may comprise an adaptive speed control method and apparatus which utilizes a forward looking radar system to detect the distance to the vehicle in front. This distance may be dynamically managed to allow the increasing and decreasing speed of the vehicle.

The threshold speed may at least initially correspond to the current speed of the vehicle. The threshold speed may be adjustable by the driver during the cruise control mode.

The step of increasing the vehicle speed may comprise increasing the amount of fuel supplied to the engine to cause vehicle acceleration.

The step of decreasing the vehicle speed may comprise decreasing the amount of fuel supplied to the engine to cause vehicle deceleration. Alternatively, the step of decreasing the vehicle speed may comprise decoupling the vehicle wheels from the engine. The step of decreasing the vehicle speed may comprise disengaging a transmission clutch of the vehicle.

Alternatively or in addition, at least one of the steps of increasing and decreasing the vehicle speed may comprise passively allowing the vehicle speed to increase or decrease respectively due to road gradients, cutting engine power or the like. Therefore, the terms "increasing" and "decreasing" are intended to include taking an action which indirectly causes, or passively allows, the change in speed.

The method may include adaptively controlling the speed of the vehicle. The method may include detecting a vehicle in front and determining a distance to the vehicle in front. The method may include maintaining the vehicle within a distance range to the vehicle in front. The step of at least one of increasing the vehicle speed, decreasing the vehicle speed, calculating the first predetermined value and calculating the second predetermined value may be dependent on the distance to the vehicle in front.

Figure 3:
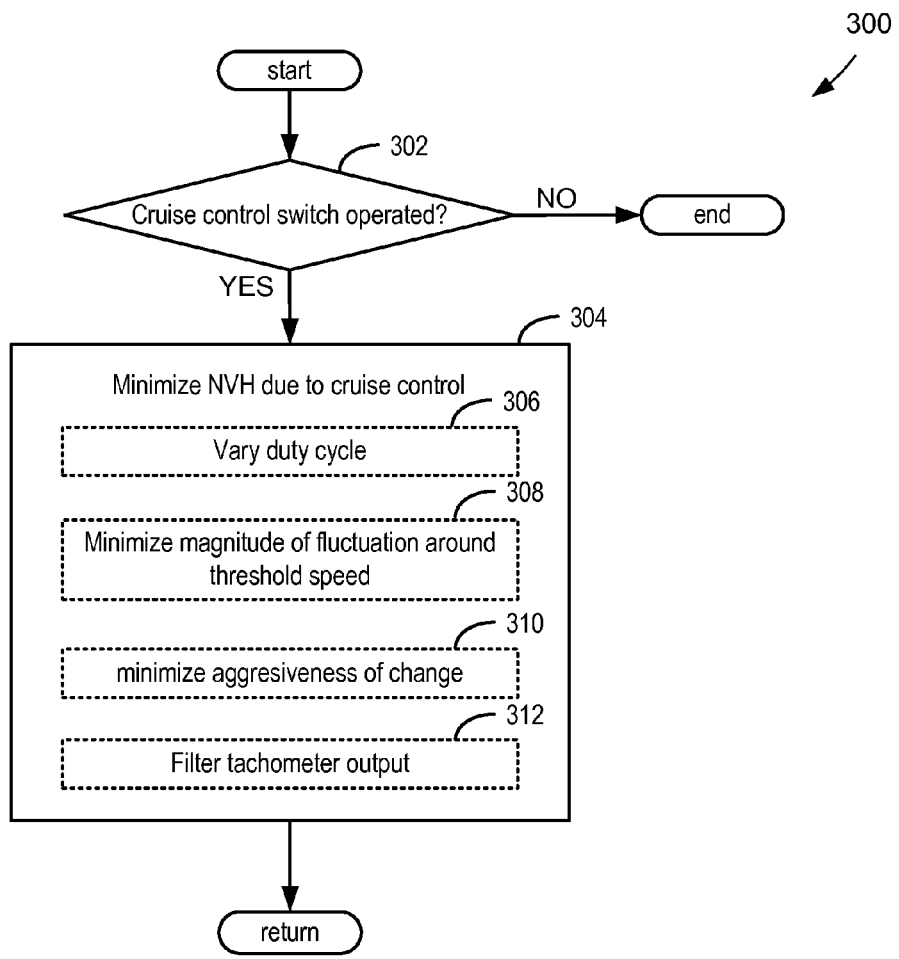
FIG. 3 is a flow chart of methods for controlling NVH due to enacting a cruise control method in accordance with the present disclosure.

The above method may affect characteristics of the vehicle and/or engine, such as noise, vibration, and harshness (NVH) characteristics. FIG. 3 shows a flowchart of methods that may be enacted to minimize audio, visual or tactile phenomena manifested as NVH characteristics associated with or produced by the cruise control mode. The method 300 starts with an engine on event than proceeds to step 302 where it is determined if the cruise control switch has been operated. If at 302, the cruise control switch has not been operated (NO) the method ends.

If, at 304, the cruise control switch has been operated (YES) the method proceeds to 304 where actions are taken to minimize NVH characteristics that may be caused by enacting a cruise control method in accordance with the present disclosure. The actions listed in step 304 occur concomitantly with steps, which may be those outlined in FIG. 2, to control vehicle speed. At 306, the duty cycle may be varied to minimize large gains and losses in vehicle speed. Varying the duty cycle may involve varying the torque applied to reach a speed a first value above a threshold speed, described in greater detail below in reference to FIG. 5. Varying the duty cycle may also involve reducing the magnitude of fluctuation in speed as described below and further in reference to FIG. 5

At 308, the magnitude of fluctuation around threshold speed may be minimized. In one example, this may mean the first and second values are reduced such that they are less different from the threshold speed and thus changes in speed are reduced due to the narrow range of speeds visited by the cruise control device. This is described in further detail below in reference to FIG. 5

At 310, the aggressiveness of the change in speed is minimized. This may mean that transitions in fueling and throttle actuations and deactivations are made to be more gradual. This may be accomplished by a readable program stored and carried out by engine controller 12. Example embodiments with varied aggressive in speed change are shown and described below in reference to FIG. 5

At 312, another example of reducing NVH may be filtering tachometer output to alter the display. Some methods of increasing and decreasing vehicle speed involve rapid and/or large changes in engine speed and this may be noticeable to the driver from the tachometer display. This may be mitigated using a tachometer filtering algorithm. The method 300 then returns.

Several of the actions shown at step 304 may be undertaken simultaneously or, in another example, one may be enacted at a time. Enacting the various methods to minimize negative NVH characteristics due to cruise control may be further responsive to additional input from sensors. For example, large changes in engine speed as indicated by a hall effect sensor may trigger a filtering algorithm for the tachometer display. Such large changes may further trigger a minimization of magnitude of fluctuations around the threshold speed. After steps to minimize NVH characteristics have been enacted they may be continued as long as the cruise control switch is operated. In an alternate example, these methods may occur when triggered by particular sensors or under particular cruise control conditions.

Figure 4:
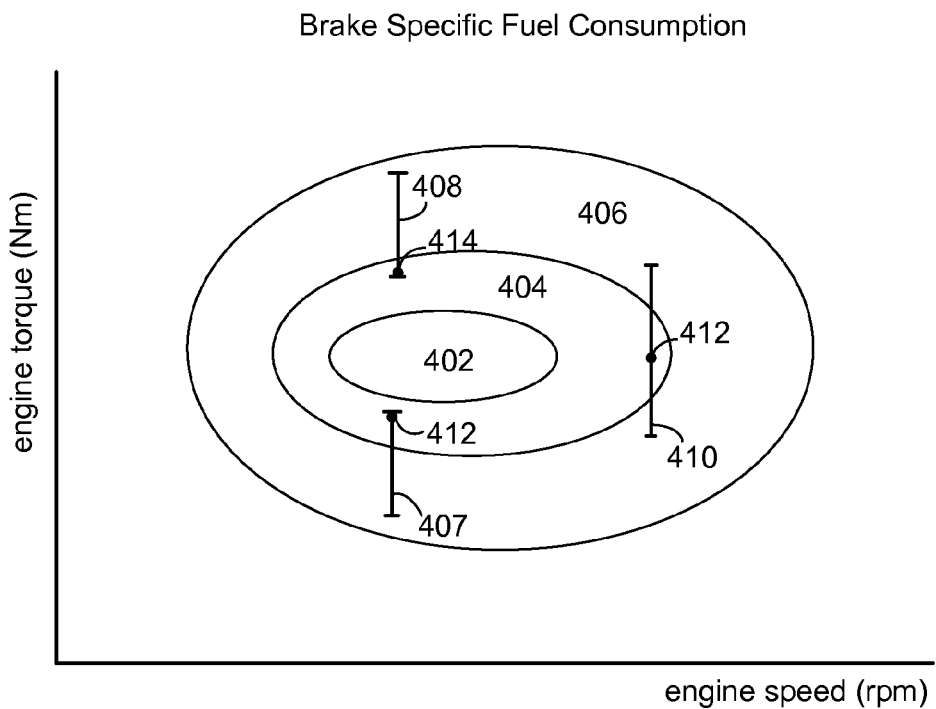
FIG. 4 shows a map of the brake specific fuel consumption for given engine torque and speed.

Referring now to FIG. 4, a map is shown of brake specific fuel consumption for given engine speeds and torques. High efficiency range 402 shows a region of torques and speeds at which a given engine operates at optimal fuel economy. Mid efficiency range 404 shows where an engine may operate moderately efficiently and low efficiency range 506 shows the region of torque and engine speeds at which the engine may operate less efficiently to provide a given output. Brake specific fuel consumption maps such as that shown in FIG. 4 may be stored in read only memory 110 of engine controller 12 and used in conjunction with engine operating parameters in determining a first and second value around a given threshold vehicle speed.

For example if a cruise control switch is operated at a given engine speed and torque there may be a range of values to maintain the approximate resultant vehicle speed. A first value may be chosen based in that range to provide the maximal fuel efficiency for a given range. Examples of such ranges are shown at 407, 408, and 410. In the range indicated by 407, a first value may be chosen by controller 12 so that vehicle speed is maintained by pulse phases with higher torque 412 such that during pulse phases of cruise control when fueling is increased higher torque values correspond to the most fuel efficient operation of the engine. Conversely, in the range indicated by 408, a lower torque 414 may correspond to the maximal fuel efficiency which will be used to calculate a first value once a cruise control switch has been operated.

In another example, a range 410 may exist where a middle torque value may provide the highest fuel economy in a given range. Brake specific fuel consumption maps such as the example shown may be used by an engine controller in declaring a first and second threshold value, but also in determining how a target speed is reached, a concept described in greater detail below in reference to FIG. 5.

A pulse phase in which fueling is increased in order to reach a vehicle speed which is a first value above the threshold speed may vary in its length (altering the duty cycle). For a given difference between the threshold speed and a high speed, a longer duration of fueling (with a shallower slope) may correspond to a lesser rate of acceleration. Conversely, a steeper slope and shorter duration of fueling may correspond to a higher rate of acceleration. These durations may be adjusted to achieve maximal fuel economy and to minimize noise, vibration and harshness effects felt by a vehicle user. In addition to variations in duty cycle and duration of fueling, fueling increases may not be consistent for an entire pulse phase and an engine may be more efficient in ramping up a fueling increase toward the end of a pulse phase, for example.

In one example, an engine torque applied during the pulse phase may be selected based on the current engine speed and the BSFC maps stored in the controller. The controller may determine a range of available applied torque that will meet cruise control requirements (e.g., maximum duration of the pulse phase, minimum and maximum acceleration rates, etc.). Then, from the available range, the torque that minimizes fuel consumption may be selected. This approach may be repeated for each pulse phase given the engine speed for that phase. This may result in a first torque value applied at a first engine speed in a first pulse phase in a first gear, and a second torque value applied at a second engine speed in a second pulse phase in a second gear, such as due to a gear shift between the first and second pulse phases. Because of the potentially different speeds and the different positions in the BSFC map, different torques limits may be selected to minimize the fuel consumption (e.g., the first torque may be a torque at a higher end of the available range at the first speed, and the second torque may be a torque at a lower end of the available range at the second speed, such as illustrated in FIG. 4). Accordingly, the amount of engine torque applied in the pulse phase may vary from one pulse event to another pulse event.

Figure 5:
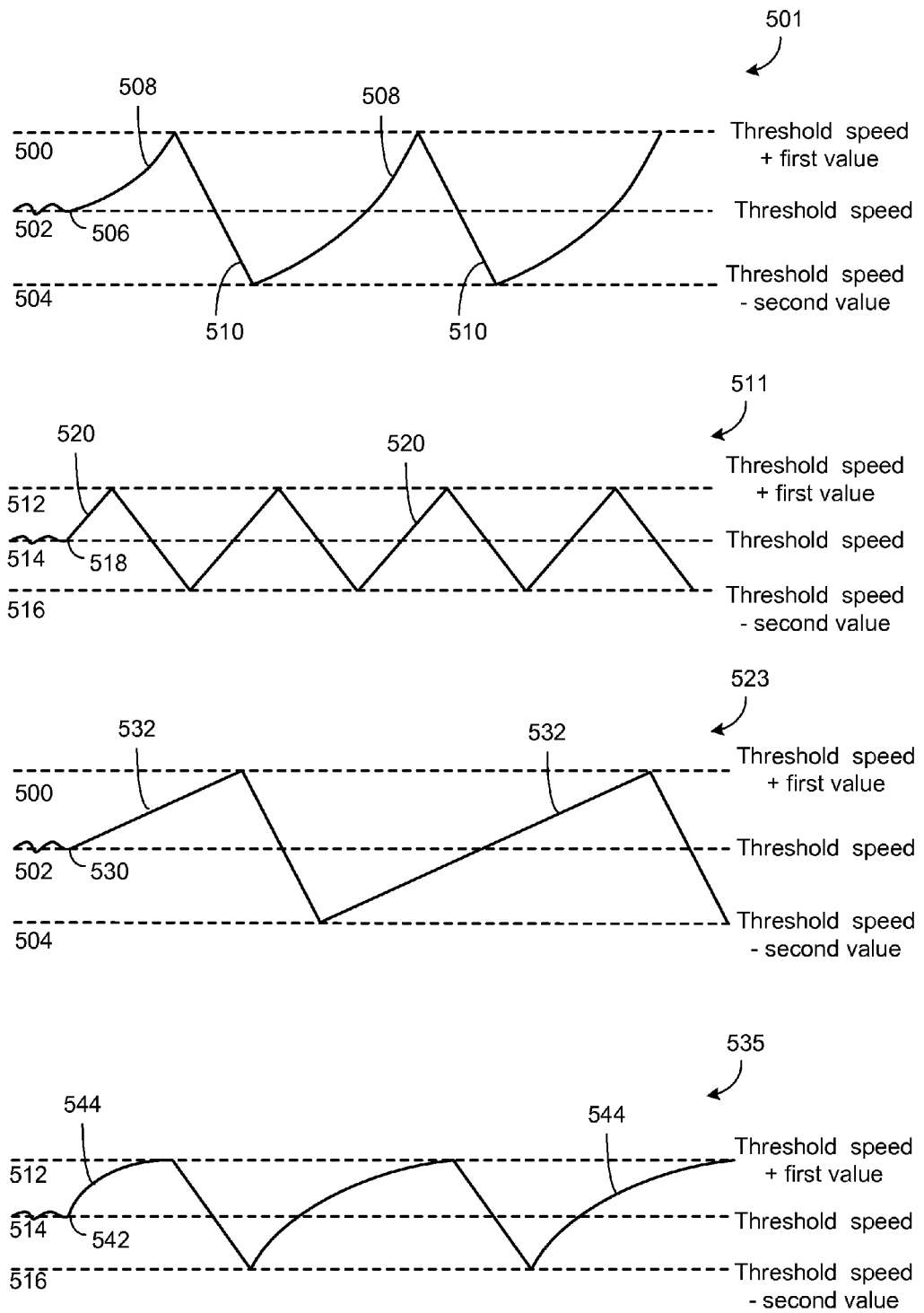
FIG. 5 shows example embodiments of vehicle speed during pulse and glide phases in accordance with the present disclosure.

Referring now to FIG. 5 examples of vehicle speed variations under pulse and glide cruise control methods in accordance with the present disclosure are shown. In a first example 501 a vehicle speed is indicated by the solid black line. At 506 a user operates the cruise control switch indicating a threshold speed 502. For given engine parameters and the selected vehicle threshold speed 502 engine controller 12 may calculate a first threshold and a second threshold. During a pulse phase 508 of cruise control, fueling is increased to reach a high speed comprising the threshold speed plus the first value at 500. In the first example 501 the pulse phase 508 may increase in steepness (corresponding to faster acceleration) toward the end of a pulse phase. The shape and slope of the pulse phase 508 may be determined by an engine controller based on operating parameters and on a brake specific fuel consumption map such as the example shown in FIG. 4. The glide phase 510 is dependent on road conditions and drag on an engine. However, in some embodiments, the engine may be engaged to counteract engine drag, but not apply torque to the wheels to propel the vehicle. In another example, during a glide phase of cruise control engine combustion may be discontinued. The glide phase 510 may be substantially the same regardless of a shape and slope of a pulse phase.

A second example 511 is shown with a smaller first and second value, such that difference between the high speed 512 (a first value in excess of the threshold speed 514) and the low speed 516 (a second value below the threshold speed 514) is less than the difference as shown in the first example 501. This difference between high and low speed may be adjusted to minimize NVH affects due to cruise control. Also in the second example, the pulse phase 520, after a cruise control switch has been operated at 518, has a linear shape such that acceleration throughout the pulse phase 520 is consistent.

In a third example 523, the pulse phase 532 is linear. However, in the third example 523, the slope of the pulse phase 532 is shallower than that of the pulse phase 520 in the second example 511. A shallower slope corresponds to a lesser rate of acceleration. Differences in slope of the pulse phase 532 and in a difference between threshold speed 502 and a high speed 500 and low speed 504 may vary a duty cycle and thus the duration of fueling, compared to another example. These variations in duty cycle may be exploited to reduce noise, vibration, and harshness characteristics due to pulse and glide type of cruise control.

In a fourth example 535, a pulse phase 544 may start with an aggressive fuel increase (steep starting slope) and transition into a more moderate fuel increase (applied torque). These types of variations in shape of the pulse phase may be exploited to vary the aggressiveness of fueling increase (torque application, higher or lower) in different regions of a pulse phase to minimize noise, vibration, and harshness effects due to a pulse and glide type of cruise control.

The above described examples are provided to demonstrate differences in a pulse and glide type of cruise control. Additional variations are possible. Furthermore, throughout a course of cruise control operation an engine controller may vary duty cycle, first and second threshold values, aggressiveness of fueling, and/or the shape or slope of a pulse phase to further maximize fuel efficiency or minimize noise, vibration and harshness.

The present disclosure describes systems and methods for controlling the speed of a vehicle comprising: during a pulse phase of cruise control, applying engine torque to raise speed, the amount and duration of which being responsive to engine speed; and during a glide phase of cruise control, discontinuing engine combustion. In this way cruise control may maintain a mean speed equivalent to a desired, threshold speed while reducing fuel consumption, and NVH effects felt by the end user compared to traditional cruise control methods.

Whilst specific embodiments of the present disclosure have been described above, it will be appreciated that departures from the described embodiments may still fall within the scope of the present disclosure.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of automatically controlling a speed of a vehicle, comprising:
    receiving an input from a driver to enter a cruise control mode;
    determining a threshold speed;
    increasing the vehicle speed to a speed which is a first predetermined value above the threshold speed;
    decreasing the vehicle speed to a speed which is a second predetermined value below the threshold speed; and
    repeating the steps of increasing and decreasing the vehicle speed until an input is received to exit the cruise control mode; and
    further comprising detecting a vehicle in front, determining a distance to the vehicle in front, maintaining the vehicle in front within a distance range to the vehicle in front and calculating the first predetermined value and the second predetermined value dependent on the distance to the vehicle in front.

2. The method as claimed in claim 1, wherein the threshold speed corresponds to a current speed of the vehicle and the threshold speed is adjustable by the driver during the cruise control mode.

3. The method as claimed in claim 1, wherein increasing the vehicle speed comprises increasing an amount of fuel supplied to an engine to cause vehicle acceleration.

4. The method as claimed in claim 1, wherein decreasing the vehicle speed comprises decreasing an amount of fuel supplied to the engine to cause vehicle deceleration.

5. The method as claimed in claim 1, wherein decreasing the vehicle speed comprises disengaging a transmission clutch of the vehicle.

6. The method as claimed in claim 1, wherein at least one of the first and the second predetermined values is selected to produce an optimal brake specific fuel consumption value from the engine.

7. The method as claimed in claim 1, wherein at least one of the first and second predetermined values is a predetermined percentage above the threshold speed.

8. The method as claimed in claim 1, further comprising reducing audio, visual or tactile phenomena associated with a repeated change in the vehicle speed.

9. The method as claimed in claim 8, further comprising reducing the audio, visual or tactile phenomena associated with the repeated change in the vehicle speed by reducing a sound produced by the engine.

10. The method as claimed in claim 8, further comprising reducing the audio, visual or tactile phenomena associated with the repeated change in the vehicle speed by varying a duty cycle of the engine.

11. The method as claimed in claims 8, further comprising reducing the audio, visual or tactile phenomena associated with the repeated change in the vehicle speed by changing the vehicle speed at a rate which is less perceptible to the driver.

12. A method of automatically controlling a speed of a vehicle, comprising:
    receiving an input from a driver to enter a cruise control mode;
    determining a threshold speed;
    increasing the vehicle speed to a speed which is a first predetermined value above the threshold speed;
    decreasing the vehicle speed to a speed which is a second predetermined value below the threshold speed;
    repeating the steps of increasing and decreasing the vehicle speed until an input is received to exit the cruise control mode; and
    reducing audio, visual or tactile phenomena associated with the repeated change in the vehicle speed by using a filter to alter a tachometer display.

13. The method as claimed in claim 12, further comprising detecting a vehicle in front, determining a distance to the vehicle in front, maintaining the vehicle within a distance range to the vehicle in front and calculating the first predetermined value and the second predetermined value dependent on the distance to the vehicle in front.

14. A method, comprising:
    reducing noise, vibration and harshness during pulse and glide cruise control by,
        filtering a tachometer output;
        adjusting a rate of acceleration during a pulse phase;
        varying a duty cycle of the pulse phase; and
        adjusting a difference between a high speed and a low speed.

15. The method as claimed in claim 14, wherein varying the duty cycle of the pulse phase further comprises increasing a duration of fueling.

16. The method as claimed in claim 14, wherein adjusting a difference between a high speed and a low speed further comprises reducing the difference between the high speed and the low speed.

* * * * *